US011509620B2

(12) United States Patent
Zhang et al.

(10) Patent No.: US 11,509,620 B2
(45) Date of Patent: Nov. 22, 2022

(54) COMMUNICATING SINGLE-ADDRESS REPLY MESSAGES TO ALL ADDRESSES OF RECIPIENTS OF A GROUP MESSAGE

(71) Applicant: Google LLC, Mountain View, CA (US)

(72) Inventors: Lingyi Zhang, Mountain View, CA (US); Cliff Chin Ngai Sze, Austin, TX (US)

(73) Assignee: GOOGLE LLC, Mountain View, CA (US)

( * ) Notice: Subject to any disclaimer, the term of this patent is extended or adjusted under 35 U.S.C. 154(b) by 93 days.

(21) Appl. No.: 16/896,884

(22) Filed: Jun. 9, 2020

(65) Prior Publication Data

US 2021/0385186 A1 Dec. 9, 2021

(51) Int. Cl.
*H04L 51/48* (2022.01)
(52) U.S. Cl.
CPC .................... *H04L 51/48* (2022.05)
(58) Field of Classification Search
CPC ...................................... H04L 51/28
See application file for complete search history.

(56) References Cited

U.S. PATENT DOCUMENTS

| 9,401,900 | B2 | 7/2016 | LeVasseur et al. |
| 9,509,650 | B2 | 11/2016 | Puranik et al. |
| 2015/0215241 | A1* | 7/2015 | Zhou ...................... H04L 51/16 709/206 |
| 2017/0086036 | A1* | 3/2017 | Neelakantan ....... H04L 61/2069 |
| 2017/0111298 | A1* | 4/2017 | Tomkins ................ H04L 51/32 |
| 2018/0367495 | A1* | 12/2018 | Kim ........................ H04L 51/32 |

* cited by examiner

*Primary Examiner* — Joe Chacko
(74) *Attorney, Agent, or Firm* — Middleton Reutlinger (57) ABSTRACT

Implementations set forth herein relate to subjecting a message to a group rule that causes any message, in a message thread that includes the message, to include certain addresses, regardless of the addresses that are incorporated, by a user, into an address field of a reply message. The group rule can reduce a number of messages that are not provided to a group of intended recipients because of message originators omitting the intended recipients on important messages. Furthermore, this can reduce a number of messages that are sent to compensate for certain reply messages not being received by all intended recipients. A group rule can be modified by any recipient that does not desire to be included in the group rule, and a group rule can expire when one or more conditions are satisfied, thereby causing certain messages to no longer be subject to the group rule.

19 Claims, 7 Drawing Sheets

COMMUNICATING SINGLE-ADDRESS REPLY MESSAGES TO ALL ADDRESSES OF RECIPIENTS OF A GROUP MESSAGE

BACKGROUND

Messaging interfaces, such as those employed by internet webmail and local email applications, usually include 3 types of features to determine the email recipient(s): "reply", "reply all", and adding/deleting recipients on top. The "reply-all" feature allows for a recipient of an initial message to simultaneously reply to a sender of the initial message and to anyone else the sender may have copied (e.g., "CC'd") on the initial message. In some instances, some recipient(s) of the initial message will choose to reply to a subset of the participants in the initial message (i.e., a subset of the recipient(s) and the sender of the initial message). This can also happen accidentally, for example, a given recipient may have replied exclusively to the sender by selecting "reply" instead of "reply all" without realizing it. Alternatively, a sub-thread can be spawned from a main thread, and a given recipient may respond to the subthread thinking the response was sent to the main thread, or vice versa. As each participant carries on the conversation with the selected recipient(s), over time a message thread may split to include a main branch of message(s) that are all "reply all" messages (i.e., all original participants in the initial message are included in the main branch) and other branch(es) of message(s) that each include a corresponding subset of all participants in the initial message. The parallel branches of conversation can be hard to keep track of, and are prone to error. A recipient of a reply in one of the branches that includes a subset of all participants may accidentally assume that the reply was also received by all other participants of the message thread. For example, a given recipient of the initial message can reply exclusively to the sender of the initial message, yet the sender of the initial message can then "reply all." In selecting "reply all," the sender of the initial message can errantly assume that all original recipients of the initial thread will receive the replying message of the sender when—in actuality, only the given recipient would receive that replying message. This causes an unintended information gap.

Accordingly, as the message thread continues, participants of the message thread can accidentally miss out on substantive messages that they were not copied on. While participant(s) in the message thread can monitor for inadvertent omissions of participants in replies to the thread, most such errors result precisely from a lack of awareness by the sender(s). Adding people back in and filling those people in on the missing information are steps that can waste time and computational resources. In addition, manual inspection can prolong the duration of interaction of those participant (s) with message(s) in the thread as they manually review a sender and recipient(s) of each reply. This prolonged duration of interaction can cause increased wasting of client device resources of such participant(s).

Moreover, network and/or client device resources can also be wasted as the participant(s) attempt to correct for these omissions by manually forwarding certain replies or adding certain recipients back in on replies. For example, manually forwarding or adding certain recipients can further prolong the duration of interaction with a message. As another example, adding or forwarding to certain recipient(s) that were unintentionally omitted (e.g., no substantive new content) can result in duplicative transmission of the message to the original recipient(s) of the message.

In some instances, mailing lists are promulgated in order to ensure certain participants remain on a message thread. However, mailing lists are difficult to maintain over time, and participants do not always have the access to add/remove themselves from the list. Additionally, managing subgroup conversations within a mailing list may be no different from the aforementioned situation. If each subgroup creates their own mailing list, the number of lists can become difficult to manage and wastefully consume memory of affected computing devices. Finally, mailing lists may be obscure with respect to participants that are identified in each list, and may involve extra effort from the user to find that out.

Despite certain client messaging applications allowing for auto-suggest features for streamlining searching for inclusion of certain participant addresses, the inclusion of an auto-suggested address is nonetheless manually initialized by a user. As a result, auto-suggest addresses can also cause information gaps among participants, as well as wasting of computational resources, as users repeatedly attempt to cause the auto-suggest process to identify certain addresses.

SUMMARY

Implementations set forth herein relate to a messaging client that can determine that a message being communicated and/or drafted is subject to a group rule that when applied, always CCs recipient addresses specified by the group rule. The messaging client, with prior permission from the message originator and each recipient identified by the group rule, can therefore communicate the message to each address associated with the group rule—unless the message originator performs an action to override or modify the group rule for a respective reply. In some implementations, in order to ensure execution of the group rule(s) thereafter, a server device associated with a domain of the sender of the message can receive a reply message from a recipient. The server device can determine that the reply message corresponds to the initial message that is subject to the group rule. Based on this determination, the server device can perform one or more actions in furtherance of causing each participant that is subject to the group rule to receive the reply message. In some implementations, the message originator can expressly select the group rule to be enforced via a selectable interface element. Alternatively, or additionally, the group rule can be applied to any message based on one or more of: content of the message, address(es) identified in the message, contextual data associated with the message, and/or any other information can be associated with the message and/or message originator.

As one example, when a recipient of the initial message accesses their respective messaging client application, the recipient can select a graphical user interface (GUI) element corresponding to a "reply" action that is not identified as a "reply all" feature. As a result, a reply message can be communicated from the messaging client (e.g., a web client, system application, etc.) to a messaging server associated with a domain identified in an address (e.g., user@domain_name) of an originating user of the initial message. The messaging server can then communicate the reply message to addresses identified as recipients whom the group rule applies. In other words, when each initial recipient accesses their respective messaging client application, each participant that is subject to the group rule will be notified of the reply message, despite an originating user of the reply message not selecting a "reply all" GUI element of their respective messaging client application or having individually added those addresses to the recipients list.

In some implementations, the message originator can modify the group rule, or remove themselves from the group rule, so that the message originator no longer receives messages that are responsive to the group rule. Additionally, or alternatively, a recipient of the initial message can modify the group rule at various times after the initial message has been communicated. The removal initiator may choose whether or not to notify other participants of the group rule of the removal. If they choose notification, then at least the first time that any group rule participants send or receive a message following the removal, they will receive a notification identifying any member(s) that have been removed from the rule. When a recipient is removed from a group rule after another recipient has communicated a reply message in response to an initial message (e.g., a first message to be subject to a particular group rule), the recipient will no longer be automatically copied on messages from initial recipients (including an originating sender of the initial message) replying to (i) the initial message and/or (ii) the reply message. In some implementations, a particular recipient that has removed themselves from a group rule can have exclusive permission to add themselves back into the group rule. This can limit the ability of any other recipient to add the particular recipient back to the group rule after the particular recipient has expressed an unwillingness to be included in the group rule. In some implementations, the re-addition will trigger a notification to other existing group rule participants, and depending on the group rule setting, can either be automatically accepted, or may require some user-specified number of participants to approve the re-addition. Either way, and in some implementations, the first time group rule participants send or receive a message following the re-addition, they will receive a notification that identifies any members added to the rule.

In some implementations, a group rule can correspond to data that causes a particular message or messages to be affected by a messaging application, and/or any other apparatus or module. The group rule data can therefore characterize a rule that is keyword based, recipient based, subject based, and/or otherwise based on any feature that can be identified for one or more messages. In some implementations, the group rule data can be generated using one or more machine learning models that are used, with prior permission from users, to identify one or more message features from which a rule can be based. For instance, a machine learning model can be employed to assist with identifying a topic of content for a particular message. When a particular topic is identified using the machine learning model, the user can be notified and/or have the option to accept or reject a rule that was identified using a machine learning model. This can ensure definitions and applications of group rules are controlled by users themselves. When the user accepts the suggested rule, the group rule can then be enforced for the particular message, thereby causing a list of recipients for the particular message to be modified according to the group rule.

In some implementations, a group rule can expire according to whether one or more group rule expiration conditions have been satisfied. A group rule expiration condition can be established by a user that is an originating user of an initial message that is subject to the group rule, and/or any other participant. As a result, when a group rule expiration condition is satisfied, any subsequent messages composed or a reply message (e.g., a reply to the initial message) that are not addressed to someone or a subset of the rule group, will not be received by all addresses subject to the group rule as long as the group rule expiration condition is satisfied. Additionally, or alternatively, a group rule expiration condition can be established by a particular recipient that is a recipient of the initial message. As a result, when a group rule expiration condition of the particular recipient is satisfied, any subsequent replies to the initial message or a reply message (e.g., a reply to the initial message) that are not "reply all" messages, will not be received by the recipient as long as the group rule expiration condition is satisfied.

In some implementations, a group rule expiration condition can specify a particular date and/or time and can be determined to be satisfied when the particular date and/or time has been reached and/or passed. Additionally, or alternatively, a group rule expiration condition can include a particular number of recipients that have received, opened, read, replied to, and/or otherwise acknowledged a particular initial message and/or a particular reply message, and can be determined to be satisfied when the particular number has acknowledged the particular initial message and/or the particular reply message. Additionally, or alternatively, a group rule expiration condition can specify certain content being included in reply message(s) and can be determined to be satisfied when one or more reply messages, which are responsive to an initial message subject to a group rule, include the certain content. Additionally, or alternatively, a group rule expiration condition can include a threshold number of reply messages and can be determined to be satisfied when a total number reply messages for a particular initial message or a particular reply message reaches and/or exceeds the threshold number. Additional and/or alternative expiration conditions can be utilized. Further, when multiple expiration conditions are utilized, determining satisfaction of the expiration conditions can include determining expiration of any one of the expiration conditions or, alternatively, can include determining expiration of two or more (e.g., all) of the expiration conditions. Put another way, the multiple expiration conditions can be configured such that the group rule will expire when any one is satisfied or, alternatively, such that the group rule will expire only after specified multiple of the expiration conditions are satisfied.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
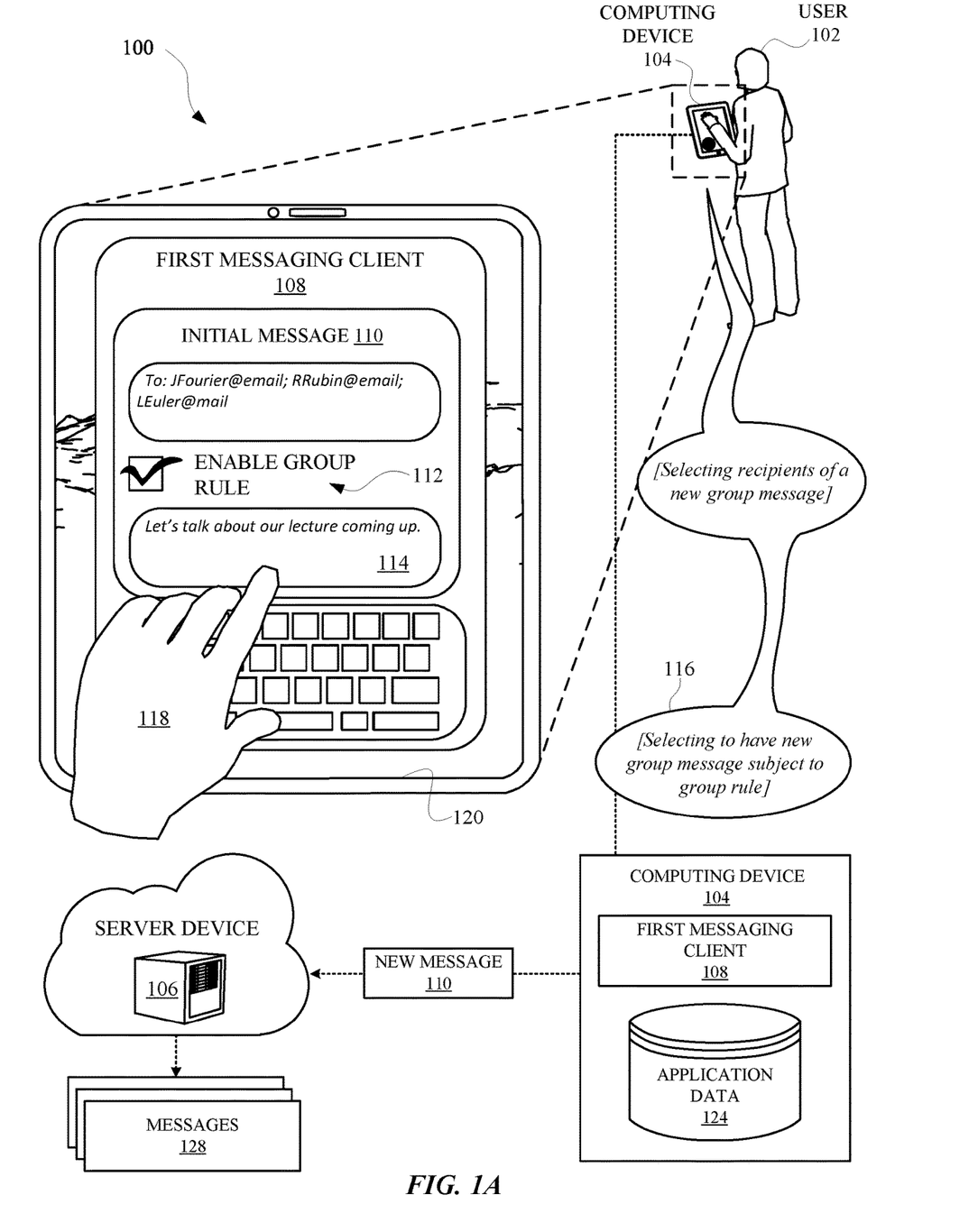
FIG. 1A, FIG. 1B, FIG. 1C, and FIG. 1D illustrate views, respectively, of a group of users participating in a message thread that is subject to a group rule, which can cause messages that are addressed to a single recipient, or a subset of addresses for a subset of participants in a group rule, to be communicated to other participants.

FIG. 1A, FIG. 1B, FIG. 1C, and FIG. 1D illustrate view 100, view 130, view 160, and 180, respectively, of a group of users participating in a message thread that is subject to a group rule, which can cause replies that are addressed to a single recipient, or a subset of addresses of initial participants, to be communicated to other participants. For example, FIG. 1A illustrates a view 100 of a user 102 generating an initial message 110 using a first messaging client 108 that is accessible via a computing device 104. In order to generate the initial message 110, the user 102 can identify a group of initial recipients (e.g., JFourier@email, RRubin@email, and LEuler@mail) that will receive the initial message 110. Additionally, the user 102 can select to enable, edit, and/or create a group rule, which can optionally be activated using a selectable element 112 that can be selected by a hand 118 of the user 102 via a display interface 120 of the computing device 104.

When the user 102 adds content to a content field 114 of the initial message 110, and selects to enable the group rule (e.g., as indicated by actions 116), the user 102 can cause the first messaging client 108 to communicate the initial message 110 to one or more server devices 106. In some implementations, the initial message 110 can be communicated to the server device 106 via one or more network connections, and the initial message 110 can include data (e.g., metadata) that indicates the initial message 110 is subject to group rule. In some implementations, the data can be stored at the computing device 104 as application data 124, in order to allow the first messaging client 108 to comply with the group rule when responding to replies from recipients of the initial message 110.

The server device 106 can receive the initial message 110 and communicate messages 128 to the group of initial recipients, while causing the messages 128 to be subject to the group rule specified by the user 102. For example, as illustrated in view 130 of FIG. 1B, a second user 156 can access the initial message 110, and generate a first reply message 134 using a second messaging client 132. When responding to the initial message 110, the user 156 can select to invoke a "reply" function that causes the second messaging client 132 to address the first reply message 134 exclusively to the message originating user that originated the initial message 110. Furthermore, based on data associated with the initial message 110, the second messaging client 132 can determine that the initial message 110 is subject to the group rule. Based on this determination, the second messaging client 132 can render a notification to the user 156 that the initial message 110 is subject to the group rule. For example, the second messaging client 132 can render a notification indicating that the initial message 110 is subject to the group rule (e.g., "This message is subject to the group rule"). Alternatively, or additionally, the second messaging client 132 can indicate that the initial message 110 is subject to the group rule by automatically populating one or more address fields of a reply message or initial message to include addresses corresponding to the group rule. Additionally, or alternatively, the second messaging client 132 can provide a selectable element 136 that, when selected, allows the user 156 to modify the group rule (e.g., remove themselves from the group rule, disable the group rule, add an address for themselves or another, etc.).

Figure 1B:
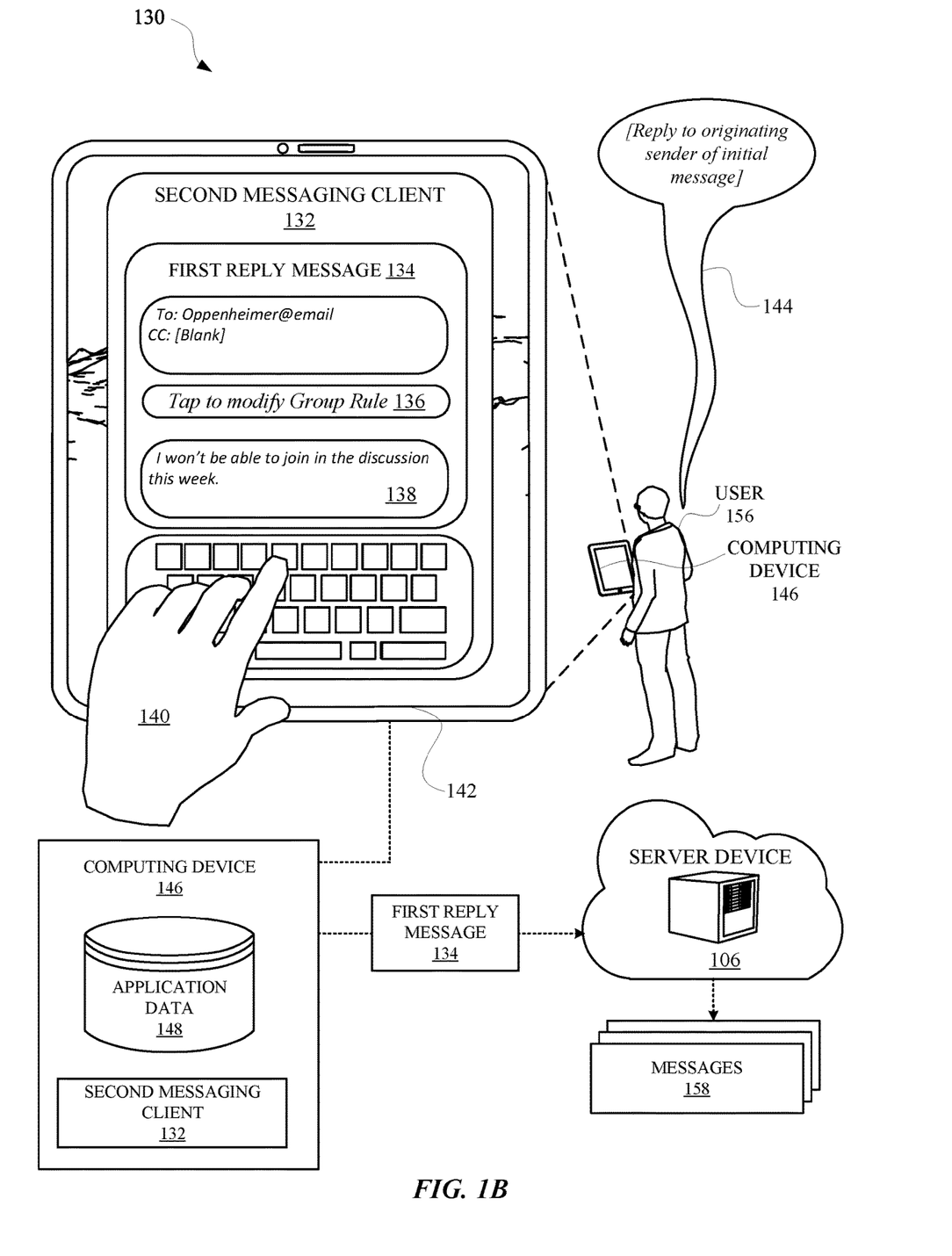

When the user 154 has generated the first reply message 134, and added content 138 to the first reply message 134, the user 154 can use their hand 140 to tap an interface 142 of computing device 146 to cause the first reply message 134 to be communicated according to the group rule. For example, when the user 154 selects to reply to the originating sender (e.g., as indicated by action 144), the computing device 146 causes the second messaging client 132 to communicate the first reply message 134 to the server device 106. Additionally, or alternatively, the computing device 146 can store application data 148, which can include meta data that is communicated with the first reply message 134 to the server device 106.

In some implementations, the application data 148 and/or the server device 106 can include a unique identifier (e.g., such as a hash value, token, etc.) corresponding to the initial message 110. When a message in a thread that includes the initial message 110 is communicated from the messaging client 108 and/or the server device 106, the first messaging client 108 and/or the server device 106 can determine whether the message corresponds to the unique identifier. When the message is determined to correspond to the unique identifier, the first messaging client 108 and/or the server device 106 can determine whether the unique identifier corresponds to a group rule. When the unique identifier is determined to be associated with the group rule, the first messaging client 108 and/or the server device 106 can identify addresses that are subject to the group rule. Furthermore, the first messaging client 108 and/or the server device 106 can determine whether one or more of the addresses are missing from an address field of the message. When one or more missing addresses are identified, the first messaging client 108 and/or the server device 106 can operate to cause the message to be communicated to the one or more missing addresses, as well as the addresses identified in an address field(s) of the message. Additionally, or alternatively, the first messaging client 108 and/or the server device 106 can modify data associated with the message in order to cause the message to be communicated to the one or more missing addresses. For example, the data can be meta data that is stored in association with the user 102, the initial message 110, the unique identifier, and/or any other information that can be associated with the group rule and/or a message thread. The data can be modified prior to the first messaging client 108 and/or the server device 106 communicating the message to another messaging client and/or another server computing device.

In some implementations, the unique identifier is generated by a messaging client and/or a server computing device and is either modifiable, or not modifiable, by a user via an interface of a messaging client. In some implementations, the unique identifier can be based on a subject of an initial message that is subject to the group rule, a timestamp associated with the initial message, content of the initial message, addresses of the initial message, and/or any combination thereof. For example, the unique identifier can be a hash value that is generated based on one or more instances of data associated with the initial message, and the hash value is generated before the initial message is received by any recipient messaging clients. Additionally, or alternatively, an initial message can be modified by a messaging client and/or a server computing device to include addresses identified for a group rule prior to any recipient (besides a drafter of the initial message) accessing the initial message.

When the server device 106 receives the first reply message 134, the server device 106 and/or another computing device or application can determine that the first reply message 134 is subject to the group rule. In some implementations, the server device 106 can determine that the first reply message 134 is subject to the group rule based on message meta data characterizing parameters of the group rule (e.g., identifier for the initial message, identifier for an originating sender, and/or identifier(s) for initial recipients of the initial message, etc.). In some implementations, the server device 106 can determine that the reply message 134 is subject to the group rule based on data that is stored in association with the initial message at the server device 106. Additionally, or alternatively, the server device 106 can determine that the reply message 134 is subject to the group rule based on data that is stored in association with the originating sender and/or an address of the originating sender (e.g., Oppenheimer@email).

In order to provide messages 158 according to the group rule, the server device 106 and/or the computing device 146 can identify one or more initial recipient addresses of the initial message, and/or one or more other addresses stored in association with the group rule. When the addresses are identified, the server device 106 and/or the computing device 146 can generate messages 158. Each message of the messages 158 can include content from the first reply message 134 (e.g., "I won't be able to join in the discussion this week."), and can be addressed to a respective address identified for each person's address that is subject to the group rule. In this way, although the user 156 may have selected to reply exclusively to the originating sender (e.g., Oppenheimer@email), the group rule can cause the first reply message 134 to be communicated to a particular set of addresses that are subject to the group rule. For example, the first reply message 134 can be communicated to the originating sender (e.g., Oppenheimer@email), as well as the group of initial recipients (e.g., JFourier@email, RRubin@emails, and LEuler@email), and optionally without sending to an address for the user 156 (e.g., RRubin@email).

Alternatively, the first reply message 134 can be communicated to the originating sender and a particular group of addresses, which can include one or more of the initial recipients and/or one or more addresses or users that are different from the initial recipients. For example, despite a particular message that is a subject to a group rule being addressed to a first set of recipients by an authoring user, the particular message can be communicated to a second set of recipients, which may or may not include addresses identified in the first set of recipients. In some implementations, the group rule can be applied to a message that is not a reply message and/or a message that is not part of an existing thread. In some implementations, any user that is subject to a group rule, or otherwise has an address that is identified by a group rule, can: remove themselves from the group rule at any point, add themselves back in at any point, and/or be accepted back to the group rule at any point.

In some implementations, the second messaging client 132 can receive an input from the user 156 indicating that the user 156 would like the first reply message 134 to be communicated to the server device 106. In response, the second messaging client 132 and/or the server device 106, can modify the first reply message 134, before or after the user 156 provides the input, to include addresses that are subject to the group rule that the first reply message 134 is subject to. For example, the second messaging client 132 and/or the server device 106 can determine whether the first reply message 134 is subject to a group rule. Based on this determination, the second messaging client 132 and/or the server device 106 can identify one or more addresses that were not already identified in an address field of the first reply message 134. For example, subsequent to the user 156 selecting to send the first reply message, the address "Oppenheimer@email" can be exclusively identified in the address field(s) of the first reply message 134. However, when the second messaging client 132 and/or the server device 106 determines that the first reply message 134 is subject to the group rule, the second messaging client 132 and/or the server device 106 can modify the first reply message 134. For instance, the second messaging client 132 and/or the server device 106 can modify the first reply message 134 to include the addresses that are subject to the group rule (e.g., JFourier@email, RRubin@emails, and LEuler@email). Thereafter, the second messaging client 132 and/or the server device 106 can cause the first reply message 134 to be communicated to each domain server corresponding to each address identified in the address field(s) of the first reply message 134.

In some implementations, the server device 106 to which the first reply message 134 is initially sent can (prior to transmitting the first reply message 134 to any client computing devices of user-designated recipients of the reply message, or otherwise causing the reply message to be viewable by any of the original recipients) determine whether the first reply message 134 should be modified based on the group rule—and modify the first reply message 134 if so. For example, the server device 106 can determine that the first reply message 134 is subject to the group rule and, in response to determining that the first reply message 134 is subject to the group rule, determine if the first reply message 134 conforms to the group rule. If the first reply message 134 is determined to be subject to the group rule but does not conform to the group rule, the server device 106 can modify the first reply message 134 so that the first reply message 134 conforms to the group rule. For example, if the group rule specifies certain recipient(s) should be included, that are not amongst the user-designated recipients (e.g., addresses identified in an address field of the reply message 134), the server device 106 can modify the first reply message 134 so that such omitted certain recipients are included as recipients of the first reply message 134. For instance, such omitted recipients can be added to "CC:" field or a "TO:" field of the first reply message 134. Thereafter, the server device 106 can transmit and/or make accessible the first reply message 134 according to the identified recipient addresses.

In these and other manners, when the first reply message 134 is modified in this way, each identified recipient can receive a single instance of the first reply message 134. This can be advantageous over other attempts to ensure all recipients receive reply messages according to certain rules. For example, when the group rule is not implemented as discussed herein, a recipient may select to "reply all," or manually forward, certain messages, in order to provide those messages to omitted recipients. However, this can cause some recipients to receive multiple instances of a reply message, thereby wasting computational resources such as memory and network bandwidth—particularly when large attachments are being shared.

Figure 1C:
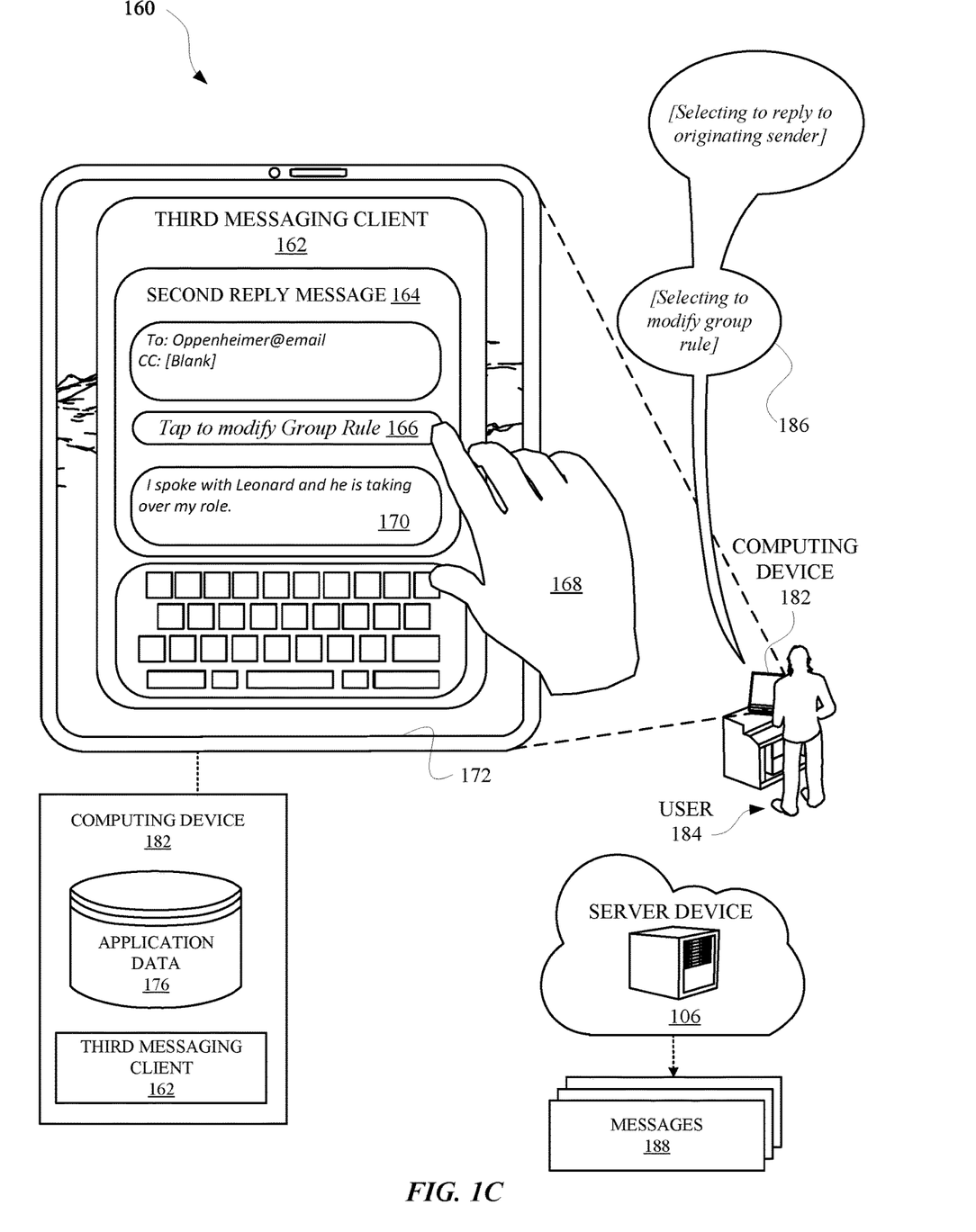
Figure 1D:
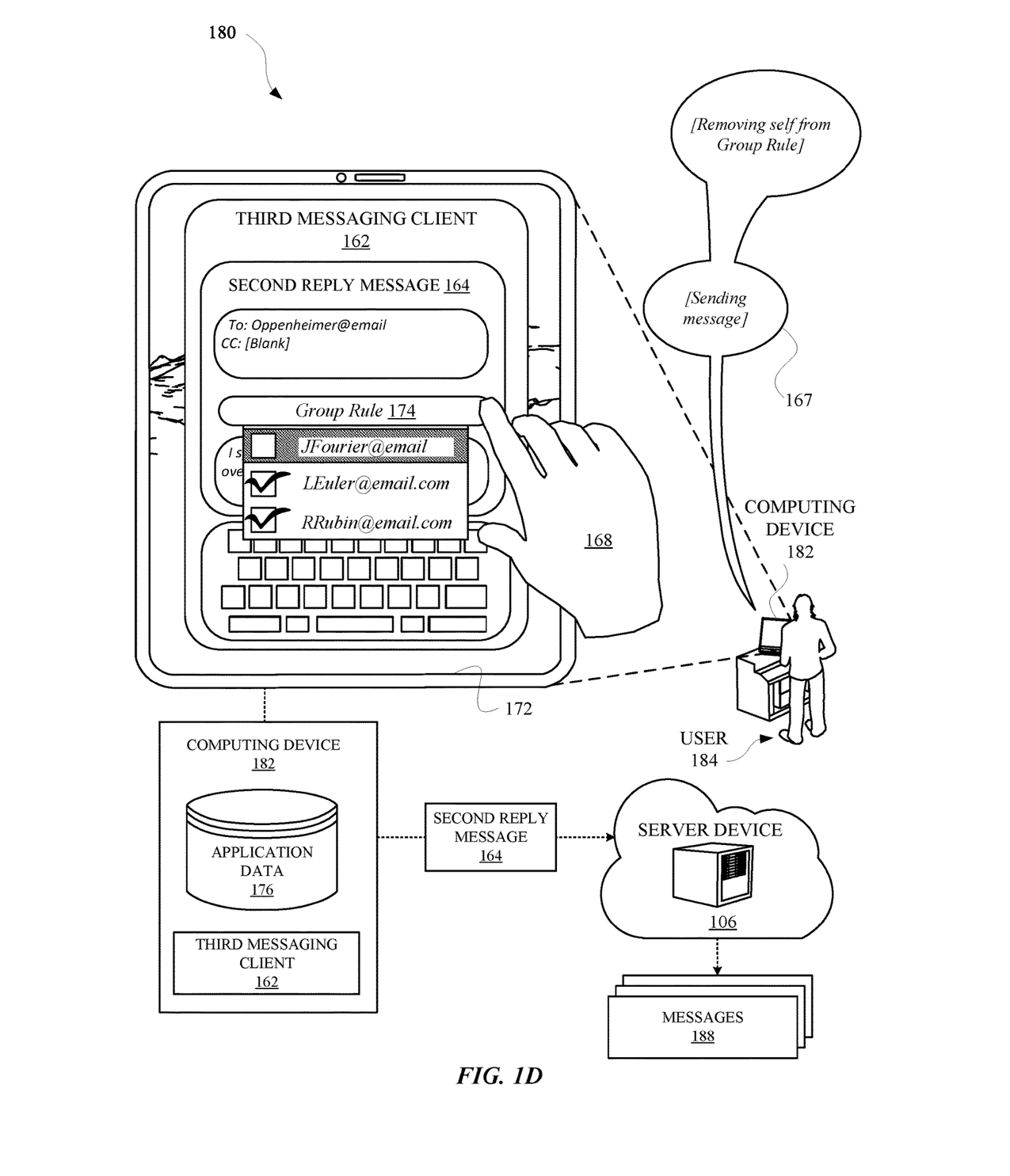

When another user 184 receives the first reply message 134 via their respective computing device 182, the user 184 can respond to the first reply message 134 and also modify the group rule, as illustrated in FIG. 1C. For example, when the user 184 receives the first reply message 134, the user 184 can generate a second reply message 164 using a third messaging client 162. According to actions 186, the user 184 selects to reply to the originating sender of the initial message and selects to modify the group rule by using their hand 168 to tap a selectable element 166 rendered at an interface 172 of the computing device 182. For example, in response to the user 184 tapping the selectable element 166, the third messaging client 162 can render a group rule interface 174.

The user 184 can use their hand 168 to modify the group rule via the group rule interface 174. For example, in some implementations, the group rule interface 174 can provide additional selectable elements that allow the user 184 to remove their address (e.g., JFourier@email) from the group rule. In this way, when the user 184 provides content 170 for the second reply message 164, and uses the third messaging client 162 to send the second reply message 164, the user 184 will not receive further messages that are responsive to the initial message 110, and/or any other reply message(s) otherwise stemming from the initial message 110.

In some implementations, when the user 184 selects to send the second reply message 164, the second reply message 164 can be exclusively addressed to an originating sender of the initial message 110. However, based on the group rule and/or application data 176 characterizing the group rule, the third messaging client 162 can communicate the second reply message 164 from the computing device 182 and cause the second reply message 164 to be communicated to multiple addresses. For example, the second reply message 164 can be communicated from the computing device 182 to the server device 106 and/or another computing device. When the server device 106 receives the second reply message 164, the server device 106 can determine that (i) the second reply message 164 is subject to the group rule and/or (ii) whether one or more group rule expiration conditions have been satisfied.

A group rule expiration condition can be a condition that, when satisfied, causes the group rule to no longer affect messages—as long as the condition remains satisfied. In some implementations, the server device 106 can determine that no group rule expiration condition is associated with the group rule. Therefore, the server device 106 can receive the second reply message 164 and communicate messages 188 to each recipient of the initial recipients according to the modified group rule—which does not include at least one of the initial recipients (e.g., JFourier@email). In some implementations, the user 184 can have exclusive permission to add themselves back to the group rule. In other implementations, an originating sender that establishes the group rule for an initial message can prevent a recipient from adding themselves back to a group rule after the recipient has removed themselves from the group rule. Additionally, or alternatively, the user 184 can share permission(s) with other recipients of the initial recipients for removing the user 184 from the group rule and/or adding the user 184 to the group rule.

In some implementations, the messaging clients of FIG. 1A-1D can be provided by a single entity or multiple different entities. Additionally, or alternatively, each initial recipient of the group of initial recipients can have addresses that are of the same domain or different domains. However, data that is provided to each messaging client with message content can characterize one or more group rules, thereby allowing each message to be subject to one or more group rules regardless of domain and/or messaging client used by a recipient. In some implementations, data that is provided with a message and/or other media (e.g., picture(s), video(s), link(s), audio, calendar invite, webpage, and/or any other media) can include information from which to determine whether the message and/or other media is subject to the group rule.

Figure 2:
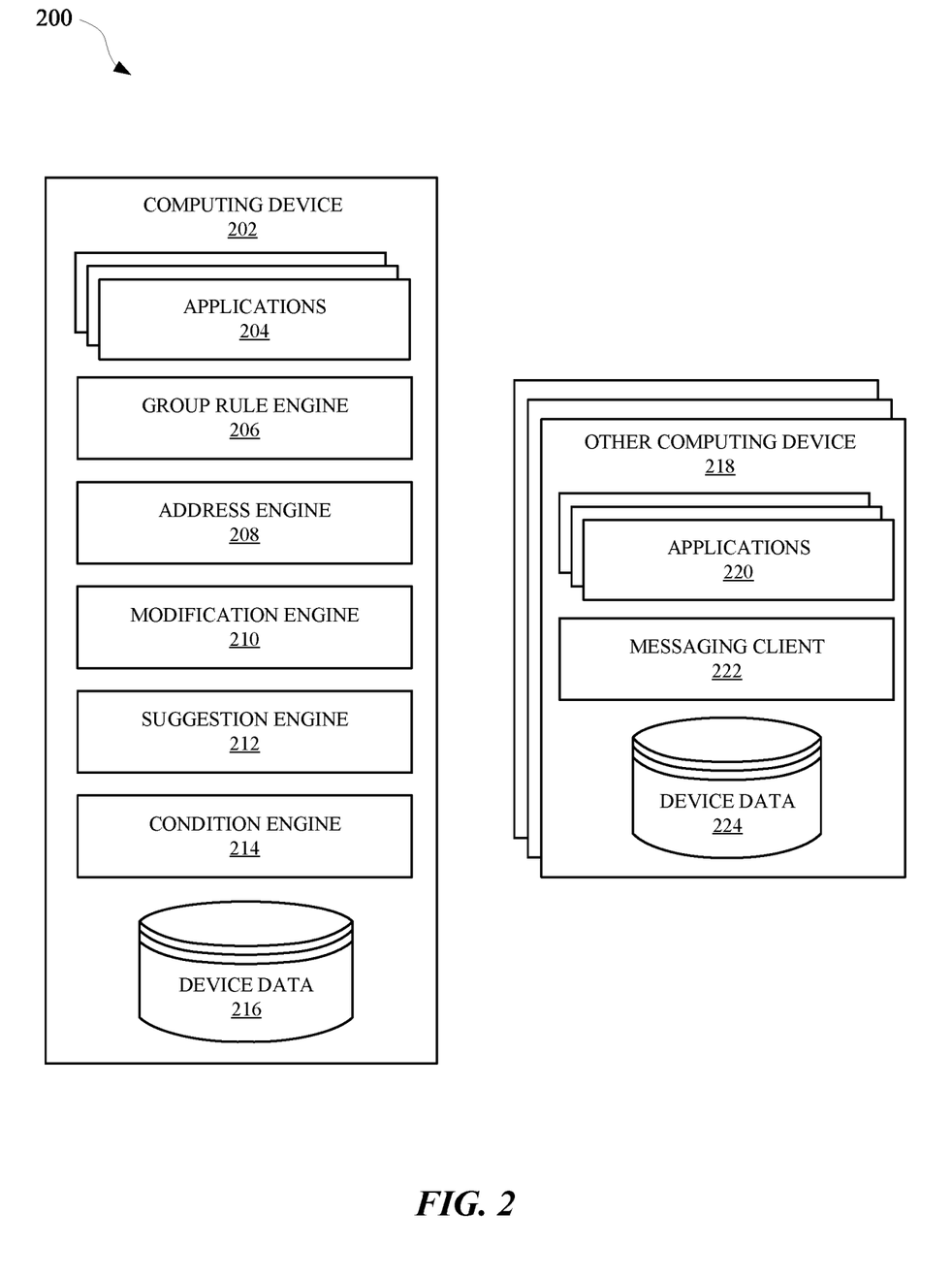
FIG. 2 illustrates a system for providing a group rule that is enforceable by a server computing device(s) and/or a client computing device(s) facilitating communication(s) between a plurality of users.

FIG. 2 illustrates a system 200 for providing a group rule that is enforceable by one or more computing devices that are facilitating communications between users. The system 200 can include a computing device 202 and other computing devices 218. In some implementations, the computing device 202 can be a server computing device and the other computing devices 218 can be client computing devices. Each computing device 218 can include one or more applications 220 and/or a messaging client 222, as well as device data 224 that is accessible to the applications 220 and/or the messaging client 222. The computing device 202 can be in communication with the other computing devices 218 over a network, such as a local area network and/or a wide area network (e.g., internet).

The computing device 202 can include one or more applications 204, engines, and/or modules for facilitating communications between users of the messaging clients 222. For example, the computing device 202 can include a group rule engine 206 that can determine whether a communication is subject to one or more group rules. A group rule can refer to data that causes messages to be provided to certain participants—regardless of how a sender addresses a respective message. When the computing device 202 receives an indication that a message is to be communicated to one or more initial recipients, the computing device 202 can employ a group rule engine 206 to determine whether the message is subject to a group rule.

In some implementations, the computing device 202 can determine that a message is subject to a group rule based on data that is accessible to the computing device 202. For example, a user of the messaging client 222 can use an interface of the other computing device 218 to indicate that they would like a particular message to be subject to a group rule. In response, the other computing device 218 and/or the messaging client 222 can generate data that characterizes the particular message as being subject to the group rule. The generated data can be accessible, with prior permission from the user, to the computing device 202, and the group rule engine 206 can use the generated data to determine that the particular message is subject to the group rule.

When the computing device 202 determines that the message is subject to the group rule, an address engine 208 of the computing device 202 can identify one or more recipients to communicate the message to. In some implementations, the computing device 202 can limit communication of the message until all recipients associated with the group rule have been identified. In some implementations, the message can be communicated to any addresses identified in an address field of the message when an author of the message selected, at the messaging client 222, to send the message. Thereafter, the address engine 208 can identify other addresses that are associated with the group rule, but that did not receive the message from the author. When the address engine 208 identifies one or more other addresses that did not receive the message, but that are subject to the group rule, the address engine 208 can cause the computing device 202 to communicate the message to those one or more other addresses.

In some implementations, the computing device 202 can employ a modification engine 210 to determine whether a group rule associated with a particular message has been modified. In some implementations, a group rule can be modified in one or more aspects by a user whose address is affected by the group rule. For example, the user can modify a group rule to exclude themselves from further messages and/or replies that are subject to the group rule. This modification can be characterized by data that is accessible to the modification engine 210. Therefore, when the modification engine 210 determines that the group rule has been modified, the modification engine 210 can communicate information that characterizes each modification to the address engine 208 and/or the group rule engine 206. For example, the address engine 208 can receive information indicating that one or more addresses have been excluded for a particular group rule and/or have been re-added to a particular group rule. Therefore, when a message is to be sent and is subject to the particular group rule, the message can be communicated according to the addresses characterized by the information and the group rule.

In some implementations, the computing device 202 can include a suggestion engine 212 for generating data that can be used by the messaging clients 222 to render suggestions, templates, and/or other content for a user. For example, the suggestion engine 212 can generate data that can be used by a messaging client 222 to render a selectable element that, when selected, causes the messaging client 222 to suggest a modification to a group rule. For example, a user can receive an initial message that is subject to the group rule, and data provided by the suggestion engine 212 can be used to render, with the initial message, a selectable suggestion interface element. When the selectable suggestion element is selected, an address of the user can be removed from the group rule, thereby preventing the user from receiving messages stemming from the initial message. Additionally, or alternatively, when the user selects to have their address removed from the group rule, the user will not receive messages stemming from the initial message (e.g., messages included in a message thread that originated with the initial message), unless the address of the user is incorporated into an address field of another message by another user.

In some implementations, the suggestion engine 212 can generate data that, when used by a messaging client 222, can cause the messaging client 222 to identify a subject of initial recipients of an initial message. For example, the suggestion engine 212 and/or messaging client 222 can determine that a draft message, or a received message, contains particular content (e.g., content of subject, content of body, content of address field, content of message meta data, and/or any other content that can be associated with a message). The particular content can be compared to device data 216 and/or device data 224 to identify a subset of user (e.g., subset of initial recipients) that a user may want to direct the draft message, or a reply message. When the user selects the suggestion element, the messaging client 222 can populate an address field of a message with the addresses identified in the subset of initial recipients. In some implementations, the message with the subset of initial recipients can be subject to the same group rule as a received message, or a previously communicated message. Additionally, or alternatively, the message with the subset of initial recipients can be subject to another group rule that causes each recipient of the subset of initial recipients to receive reply messages, regardless of whether a recipient selects to "reply" or "reply all" to the message.

In some implementations, the computing device 202 can include a condition engine 214 for generating data that characterizes one or more conditions for a group rule, and/or characterizes whether one or more conditions for a group rule have been satisfied. A condition for a group rule can be, for example, a condition upon which the group rule will no longer be enforced for one or more messages. For example, a condition can based on a threshold date and/or time, a threshold amount of time, a threshold number of messages (e.g., including reply messages to an initial message that is subject to the group rule), content of message(s), and/or any other information that a condition can be based. In some implementations, a threshold data and/or time can be a time that, when reached and/or exceeded, causes a group rule to no longer be enforced for an initial message and/or corresponding reply messages. In some implementations, a threshold number of messages can be a total number of messages for a message thread that, when reached and/or exceeded, causes a group rule to no longer be enforced for an initial message and/or corresponding reply messages. In some implementations, content of a message for purposes of a group rule expiration condition can be content that, when incorporated into a message that is received, communicated, and/or drafted, causes a group rule to no longer be enforceable for an initial message and/or corresponding reply messages. In some implementations, when a set of the initial recipients have replied to the initial message and/or another reply message, a group rule expiration condition can be satisfied, thereby causing the group rule to no longer be enforceable for an initial message and/or corresponding reply messages. It should be noted that one or more of the conditions can be combined and/or modified to generate one or more other group rule expiration conditions.

Figure 3:
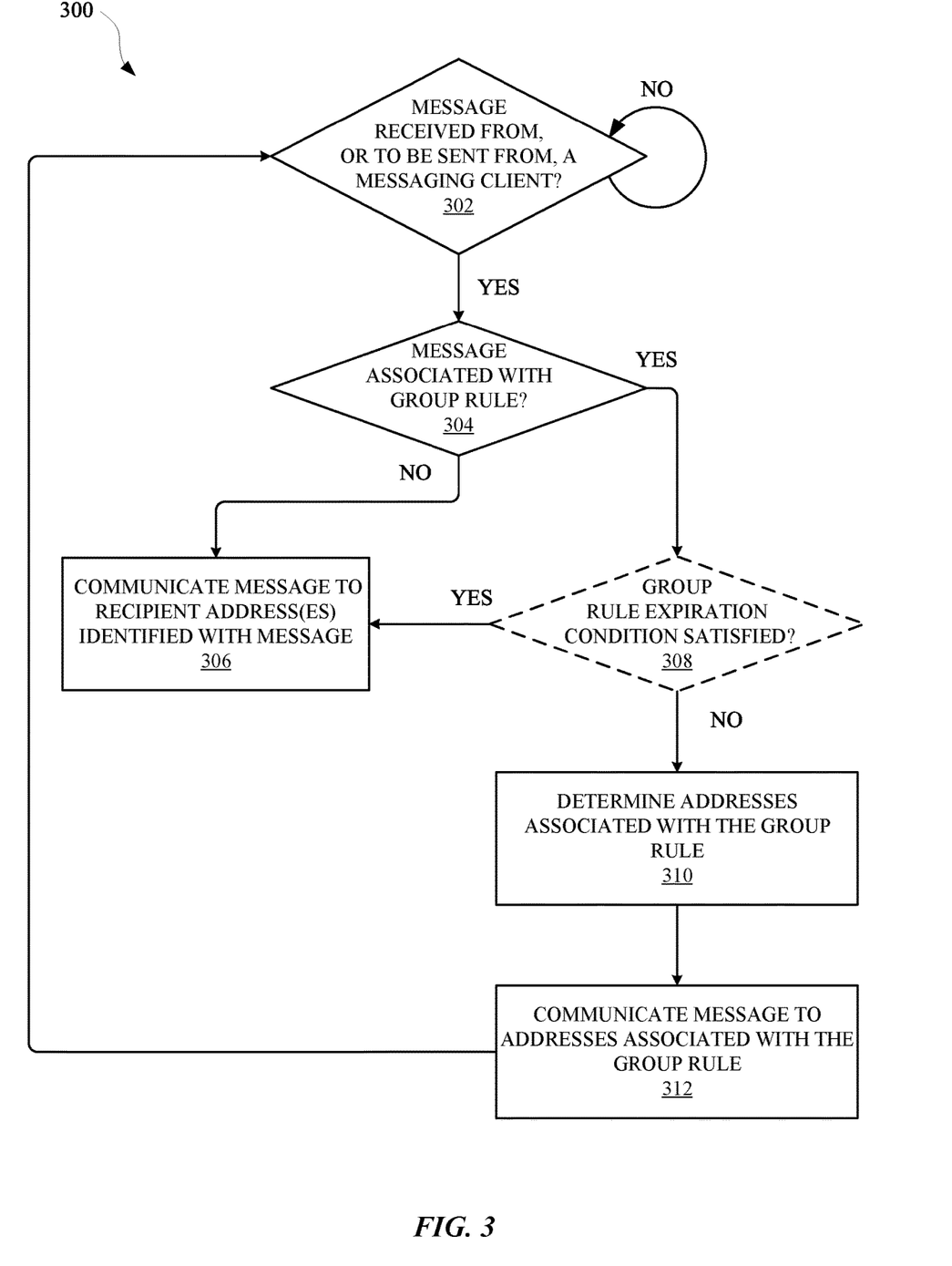
FIG. 3 illustrates a method for communicating messages according to a group rule(s) that causes all copied recipients of an initial message to also be copied on a reply message—regardless of whether an author of the reply message chose to "reply all."

FIG. 3 illustrates a method 300 for communicating messages according to a group rule(s) that causes all copied recipients of an initial message to also be copied on a reply message—regardless of whether an author of the reply message chose to "reply all." The method 300 can be performed by one or more computing devices, applications, and/or any other apparatus or module that can be associated with messaging. The method 300 can include an operation 302 of determining whether a message has been received from a messaging client, or is to be sent from a messaging client. For example, the method 300 can be performed by a server computing device that receives a message from a messaging client when a user of the messaging client selects a "send" GUI element of the messaging client. Alternatively, the method 300 can be performed by a client computing device that communicates a message from the messaging client to a server computing device, in order that the message will be accessible to one or more recipients.

When a message is determined to be received from, or to be sent from, a messaging client, the method 300 can proceed from the operation 302 to an operation 304. Otherwise, the server computing device or the client computing device can continue to determine whether a message has been received from, or is to be sent from, a messaging client, or other application or computing device. The operation 304 can include determining whether the message is associated with a group rule. A group rule can be established by an originating sender of the message, and can be used to determine addresses for recipients of the message. The group rule can cause the server computing device or a client computing device to communicate messages to addresses that were not expressly incorporated into an address field of a message. For example, an initial message that is subject to the group rule can initially be addressed and communicated to a set of initial recipients. According to the group rule, when any recipient communicates a reply message that is responsive to the initial message, but the recipient selects "reply" (e.g., a reply that is exclusively addressed to the originating sender of the initial message) instead of "reply all," the message can be communicated to the entire set of initial recipients.

When the message is determined to be subject to a group rule, the method 300 can optionally proceed to an operation 308 or an operation 310. However, when the message is determined to not be associated with the group rule, the method 300 can proceed to an operation 306. The operation 306 can include communicating the message to a recipient address, or recipient addresses, that are identified with the message. In other words, the message can be communicated to recipients that are identified explicitly by the author of the message.

When the message is determined to be associated with the group rule, the method 300 can optionally include an operation 308, which can include determining whether one or more group rule expiration conditions have been satisfied. A group rule expiration condition can be a condition that, when satisfied, causes a group rule to no longer be effective for a particular message or message thread (e.g., an initial message and corresponding reply messages). For example, the group rule expiration condition can be satisfied when a date and/or time have reached and/or exceeded. Additionally, or alternatively, a group rule expiration condition can be satisfied when one or more particular recipients receive, acknowledge, and/or respond to an initial message and/or a reply message. Additionally, or alternatively, a group rule expiration condition can be satisfied when one or more recipients of an initial message receive a threshold number of reply messages.

When the group rule expiration condition is satisfied, the method 300 can optionally proceed from the operation 308 to an operation 306, which can include communicating the message to the recipient address(es) identified with the message. However, when the group rule expiration condition has not been satisfied, or is not associated with the message, the method 300 can proceed to an operation 310. The operation 310 can include determining addresses associated with the group rule. For instance, an initial sender of the message can select the group rule to be enforced for the initial message and any subsequent replies to the message. Additionally, any recipient of the message can have a message address that is identified in group rule data that is accessible to a messaging client and/or a server computing device that is associated with the initial message. Therefore, the addresses can be determined from the group rule data that is generated based on interactions between an initial sender of the initial message and an application interface (e.g., a webmail interface, messaging client application interface, etc.).

The method 300 can proceed from the operation 310 to an operation 312, which can include communicating the message to each address identified using the group rule data and/or any other data associated with the group rule. For example, group rule data and/or addresses corresponding to an initial message can identify two or more addresses. Regardless of whether the message is received with a single address or a subset of addresses of the two or more addresses, each of the addresses of the two or more addresses can be recipients of the message. In some implementations, when the message is an initial message that is a first message associated with a group rule, the message can be communicated to each address (i) identified by an originating sender in an address field of the message, and/or (ii) identified in other meta data that is stored in association with the message.

Figure 4:
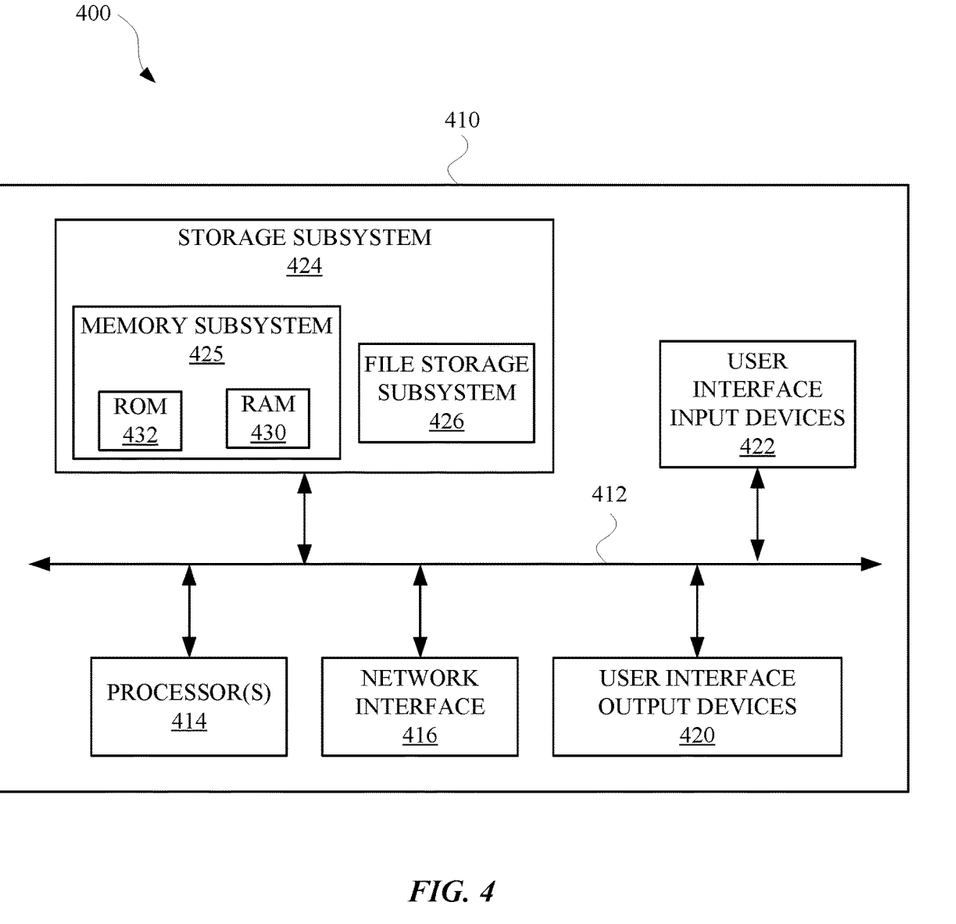
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, computing device 146, computing device 182, server device 106, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, at a computing device that is operating a messaging application, that a message being drafted by a user via the messaging application is subject to a group rule, wherein the group rule causes the message, and subsequent replies to the message, to be initially addressed to a set of recipient addresses associated with the group rule, and wherein determining that the message is subject to the group rule includes determining that one or more features of the message satisfy one or more parameters for applying the group rule to the message. The method can further include an operation of identifying, based on determining that the message is subject to the group rule, the set of recipient addresses associated with the group rule. The method can further include an operation of causing, using the set of recipient addresses, one or more address fields of the message to incorporate one or more recipient addresses, of the set of recipient address, that are not already incorporated into the one or more address fields of the message. The method can further include an operation of communicating, by the messaging application, the message to each recipient address of the set of recipient addresses in response to receiving an input from the user, wherein communicating the message to each recipient address causes the message to be accessible to each recipient user associated with each respective recipient address.

In some implementations, the one or more features include natural language content of a subject of the message. In some implementations, the one or more features include natural language content of a body of the message. In some implementations, the one or more features include one or more particular addresses already incorporated into the one or more address fields of the message.

In other implementations, a method implemented by one or more processors is set forth as including operations such as receiving, at a server computing device, a reply message that is a reply to an initial message that is subject to a group rule selected by a message originating user, wherein the initial message is generated by a first messaging client and the reply message is received from a second messaging client, and wherein a reply originating user, that drafted the reply message, selected to respond to the initial message by causing the second messaging client to exclusively populate an address field of the reply message with a recipient address. The method can further include an operation of determining, in response to receiving the reply message, that the reply message is subject to the group rule. The method can further include an operation of identifying, based on the group rule, multiple different addresses, wherein each address, of the multiple different addresses, is for a corresponding recipient of the initial message that is not already identified in the address field of the reply message. The method can further include an operation of communicating, in response to receiving the reply message and based on determining the reply message is subject to the group rule, the reply message to the multiple different addresses and to the recipient address, wherein communicating the reply message to the multiple different addresses causes the reply message to be accessible to each recipient of the initial message.

In some implementations, determining that the reply message is subject to the group rule includes: determining, based on data stored in association with the initial message, that the initial message is associated with the group rule, wherein the group rule causes each reply to the initial message to be addressed to the recipient address and at least each address of the multiple different addresses that is not already identified in the address field. In some implementations, determining that the reply message is subject to the group rule includes: determining, based on data stored in association with the recipient address, that the recipient address is associated with the group rule, wherein the group rule causes each reply to the recipient address to be addressed to each address of the multiple different addresses and the recipient address. In some implementations, the method can further include an operation of identifying, based on content of the reply message, a subset of users of the multiple different users, and causing, when a particular user of the subset of users accesses a respective messaging client, the respective messaging client to render a suggestion interface element that identifies the subset of users of the multiple different users, wherein, when the particular user selects the suggestion interface element, the respective messaging client generates an additional draft reply message that is addressed to the subset of users of the multiple different users.

In some implementations, identifying the subset of users of the multiple different users includes: comparing the content of the reply message to other content of the initial message or to additional content of other messages received by the subset of users of the multiple different users. In some implementations, the method can further include an operation of, subsequent to communicating the reply message to the multiple different addresses and to the recipient address: causing a separate messaging client, that is accessed by a particular recipient, of the recipients, to render a suggestion interface element that indicates an ability of the particular recipient to withdraw from the group rule. In some implementations, the method can further include an operation of, subsequent to communicating the reply message to the multiple different addresses and the recipient address: receiving selection data indicating that a particular recipient of the reply message is attempting to withdraw from the group rule, and modifying, in response to receiving the selection data, the group rule to create a modified group rule that excludes a particular address for the particular recipient from an additional reply message that is responsive to the initial message and the reply message.

In some implementations, the method can further include an operation of, subsequent to communicating the reply message to the multiple different addresses and the recipient address: receiving an additional reply message that is responsive to the initial message or the reply message, wherein the additional reply message is addressed exclusively to the recipient address, and communicating, based on the modified group rule, the additional reply message to the message originating user and a subset of the multiple different addresses, wherein the subset of the multiple different addresses does not include the particular address for the particular recipient. In some implementations, the modified group rule is further modifiable, exclusively by the particular recipient, to include the particular address of the particular recipient on a subsequent reply message to the initial message and another subsequent reply message to the reply message. In some implementations, determining that the reply message is subject to the group rule includes: determining whether the group rule is subject to one or more group rule expiration conditions, wherein the one or more group rule expiration conditions, when satisfied, causes the group rule to no longer affect communicated replies to the initial message and any reply messages, and when the group rule is determined to be subject to the one or more group rule expiration conditions: determining, based on data that is accessible to the server computing device, whether the one or more group rule expiration conditions have been satisfied.

In some implementations, the method can further include an operation of, when the one or more group rule expiration conditions are determined to be satisfied: generating notification data that characterizes a notification for indicating to each recipient of another reply to the initial message that the group rule has expired. In some implementations, the one or more group rule expiration conditions characterize an amount of time that the group rule is to affect a message thread that includes the initial message. In some implementations, the one or more group rule expiration conditions characterize a list of addresses that are to provide responsive messages in order to satisfy the one or more group rule expiration conditions. In some implementations, the one or more group rule expiration conditions characterize message content that, when included in a responsive message to the initial message, causes the one or more group rule expiration conditions to be satisfied.

In yet other implementations, a method implemented by one or more processors is set forth as including operations such as determining, by a computing device, that an initial message, which was drafted by a first user for a plurality of users, is accessible to a second user of the plurality of users via a messaging client of the computing device, wherein the first user causes the initial message to be subject to a group rule. In some implementations, the method can further include an operation of receiving, at an interface of the computing device, an input from the second user, wherein the input causes the computing device to generate a reply message for replying to the initial message, and wherein the reply message is addressed, by the second user, exclusively to an address of the first user. The method can further include an operation of causing, by the computing device, the reply message to be communicated to the address of the first user. The method can further include an operation of causing, based on the group rule, the reply message to be communicated to one or more other addresses of one or more users of the plurality of users.

In some implementations, causing the reply message to be provided to the one or more other addresses includes: subsequent to the computing device receiving the input from the second user: causing, based on the group rule, the messaging client of the computing device to identify the one or more other addresses of the one or more users of the plurality of users. In some implementations, the method can further include an operation of receiving, at the interface of the computing device, another input from the second user, wherein the other input corresponds to a send action of the messaging client, and wherein the other input is received before causing the reply message to be provided to the address of the first user and the one or more other addresses of the one or more users of the plurality of users.

In yet other implementations, a method implemented by one or more processors is set forth as including operations such as determining, by a computing device, that an initial message, which was provided by a first user to a plurality of users, is accessible to a second user of the plurality of users via a messaging client of the computing device, wherein the first user causes the initial message to be subject to a group rule. The method can further include an operation of receiving, at an interface of the computing device, an input from the second user, wherein the input causes the computing device to generate a reply message for replying to the initial message, and wherein the reply message is exclusively addressed to a first address of the first user. The method can further include an operation of causing, by the computing device, the reply message to be provided to a server computing device that is associated with the first address of the first user, wherein the server computing device determines that the reply message is a reply to the initial message that is subject to the group rule, and wherein the server computing device causes, based on the group rule, the reply message to be provided to each address for each user of the plurality of users.

In some implementations, the method can further include an operation of determining whether the group rule is subject to one or more group rule expiration conditions, wherein the one or more group rule expiration conditions, when satisfied, causes the group rule to no longer affect a message thread that includes the initial message, and when the group rule is determined to be subject to the one or more group rule expiration conditions: determining, based on data that is accessible to the computing device, whether the one or more group rule expiration conditions have been satisfied, wherein, when the server computing device causes the reply message to be provided to each address when the one or more group rule expiration conditions have not been satisfied. In some implementations, the one or more group rule expiration conditions characterize an amount of time that the group rule is to affect the message thread that includes the initial message. In some implementations, the one or more group rule expiration conditions characterize a list of addresses that are to provide responsive messages in order to satisfy the one or more group rule expiration conditions. In some implementations, the one or more group rule expiration conditions characterize message content that, when included in a responsive message to the initial message, causes the one or more group rule expiration conditions to be satisfied.

We claim:

1. A method implemented by one or more processors, the method comprising:
   determining, at a computing device that is operating a messaging application, that a message being drafted by a user via the messaging application is subject to a group rule,
      wherein the group rule causes the message, and subsequent replies to the message, to be initially addressed to a set of recipient addresses associated with the group rule, and
      wherein determining that the message is subject to the group rule includes:
         determining that one or more features of the message satisfy one or more parameters for applying the group rule to the message, and
         determining whether the group rule is subject to one or more group rule expiration conditions, wherein the one or more group rule expiration conditions, when satisfied, cause the group rule to no longer affect the message and the subsequent replies to the message, and
         when the group rule is determined to be subject to the one or more group rule expiration conditions:
            determining whether the one or more group rule expiration conditions have been satisfied;
   identifying, based on determining that the message is subject to the group rule, the set of recipient addresses associated with the group rule;
   causing, using the set of recipient addresses, one or more address fields of the message to be modified, by the messaging application, to incorporate one or more recipient addresses, of the set of recipient address, that are not already incorporated into the one or more address fields of the message; and
   communicating, by the messaging application and based on the modified one or more address fields of the message, the message to each recipient address of the set of recipient addresses in response to receiving an input from the user,
      wherein communicating the message to each recipient address causes the message to be accessible to each recipient user associated with each respective recipient address.

2. The method of claim 1, wherein the one or more features include natural language content of a subject of the message.

3. The method of claim 1, wherein the one or more features include natural language content of a body of the message.

4. The method of claim 1, wherein the one or more features include one or more particular addresses already incorporated into the one or more address fields of the message.

5. A method implemented by one or more processors, the method comprising:
   receiving, at a server computing device, a reply message that is a reply to an initial message that is subject to a group rule selected by a message originating user,
      wherein the initial message is generated by a first messaging client and the reply message is received from a second messaging client, and
      wherein a reply originating user, that drafted the reply message, selected to respond to the initial message by causing the second messaging client to exclusively populate an address field of the reply message with a recipient address;
   determining, in response to receiving the reply message, that the reply message is subject to the group rule, wherein determining that the reply message is subject to the group rule includes:
      determining whether the group rule is subject to one or more group rule expiration conditions,
         wherein the one or more group rule expiration conditions, when satisfied, causes the group rule to no longer affect communicated replies to the initial message and any reply messages, and
      when the group rule is determined to be subject to the one or more group rule expiration conditions:
         determining, based on data that is accessible to the server computing device, whether the one or more group rule expiration conditions have been satisfied;
   identifying, based on the group rule, multiple different addresses,
      wherein each address, of the multiple different addresses, is for a corresponding recipient of the initial message that is not already identified in the address field of the reply message; and
   communicating, in response to receiving the reply message and based on determining the reply message is subject to the group rule, the reply message to the multiple different addresses and to the recipient address,
      wherein communicating the reply message to the multiple different addresses causes the reply message to be accessible to each recipient of the initial message.

6. The method of claim 5, wherein determining that the reply message is subject to the group rule further includes:
   determining, based on data stored in association with the initial message, that the initial message is associated with the group rule,
      wherein the group rule causes each reply to the initial message to be addressed to the recipient address and at least each address of the multiple different addresses that is not already identified in the address field.

7. The method of claim 5, wherein determining that the reply message is subject to the group rule further includes:

determining, based on data stored in association with the recipient address, that the recipient address is associated with the group rule, wherein the group rule causes each reply to the recipient address to be addressed to each address of the multiple different addresses and the recipient address.

8. The method of claim 5, further comprising:

identifying, based on content of the reply message, a subset of users of the multiple different users, and causing, when a particular user of the subset of users accesses a respective messaging client, the respective messaging client to render a suggestion interface element that identifies the subset of users of the multiple different users, wherein, when the particular user selects the suggestion interface element, the respective messaging client generates an additional draft reply message that is addressed to the subset of users of the multiple different users.

9. The method of claim 8, wherein identifying the subset of users of the multiple different users includes:

comparing the content of the reply message to other content of the initial message or to additional content of other messages received by the subset of users of the multiple different users.

10. The method of claim 5, further comprising:

subsequent to communicating the reply message to the multiple different addresses and to the recipient address:

causing a separate messaging client, that is accessed by a particular recipient, of the recipients, to render a suggestion interface element that indicates an ability of the particular recipient to withdraw from the group rule.

11. The method of claim 5, further comprising:

subsequent to communicating the reply message to the multiple different addresses and the recipient address:

receiving selection data indicating that a particular recipient of the reply message is attempting to withdraw from the group rule, and modifying, in response to receiving the selection data, the group rule to create a modified group rule that excludes a particular address for the particular recipient from an additional reply message that is responsive to the initial message and the reply message.

12. The method of claim 11, further comprising:

subsequent to communicating the reply message to the multiple different addresses and the recipient address:

receiving an additional reply message that is responsive to the initial message or the reply message, wherein the additional reply message is addressed exclusively to the recipient address, and communicating, based on the modified group rule, the additional reply message to the message originating user and a subset of the multiple different addresses, wherein the subset of the multiple different addresses does not include the particular address for the particular recipient.

13. The method of claim 12, wherein the modified group rule is further modifiable, exclusively by the particular recipient, to include the particular address of the particular recipient on a subsequent reply message to the initial message and another subsequent reply message to the reply message.

14. The method of claim 5, further comprising:

when the one or more group rule expiration conditions are determined to be satisfied:

generating notification data that characterizes a notification for indicating to each recipient of another reply to the initial message that the group rule has expired.

15. The method of claim 5, wherein the one or more group rule expiration conditions characterize an amount of time that the group rule is to affect a message thread that includes the initial message.

16. The method of claim 5, wherein the one or more group rule expiration conditions characterize a list of addresses that are to provide responsive messages in order to satisfy the one or more group rule expiration conditions.

17. The method of claim 5, wherein the one or more group rule expiration conditions characterize message content that, when included in a responsive message to the initial message, causes the one or more group rule expiration conditions to be satisfied.

18. A method implemented by one or more processors, the method comprising:

determining, by a computing device, that an initial message, which was drafted by a first user for a plurality of users, is accessible to a second user of the plurality of users via a messaging client of the computing device, wherein the first user causes the initial message to be subject to a group rule;

determining whether the group rule is subject to one or more group rule expiration conditions, wherein the one or more group rule expiration conditions, when satisfied, causes the group rule to no longer affect communicated replies to the initial message and any reply messages, and when the group rule is determined to be subject to the one or more group rule expiration conditions:

determining whether the one or more group rule expiration conditions have been satisfied;

receiving, at an interface of the computing device, an input from the second user, wherein the input causes the computing device to generate a reply message for replying to the initial message, and wherein the reply message is addressed, by the second user, exclusively to an address of the first user;

causing, by the computing device, the reply message to be communicated to the address of the first user; and causing, based on the group rule, the reply message to be communicated to one or more other addresses of one or more users of the plurality of users.

19. The method of claim 18, wherein causing the reply message to be provided to the one or more other addresses includes:

subsequent to the computing device receiving the input from the second user:

causing, based on the group rule, the messaging client of the computing device to identify the one or more other addresses of the one or more users of the plurality of users.

* * * * *